(12) United States Patent
Fan et al.

(10) Patent No.: US 10,680,962 B2
(45) Date of Patent: Jun. 9, 2020

(54) METHOD AND SYSTEM FOR MANAGING TRAFFIC OF APPLICATION PROGRAMS, AND TERMINAL DEVICE CONTAINING THE SYSTEM

(71) Applicant: WANGSU SCIENCE & TECHNOLOGY CO., LTD., Shanghai (CN)

(72) Inventors: Zidao Fan, Shanghai (CN); Hailong Hu, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 44 days.

(21) Appl. No.: 16/092,906

(22) PCT Filed: Nov. 16, 2016

(86) PCT No.: PCT/CN2016/106054
§ 371 (c)(1),
(2) Date: Oct. 11, 2018

(87) PCT Pub. No.: WO2018/068361
PCT Pub. Date: Apr. 19, 2018

(65) Prior Publication Data
US 2019/0173799 A1    Jun. 6, 2019

(30) Foreign Application Priority Data

Oct. 10, 2016    (CN) .......................... 2016 1 0882916

(51) Int. Cl.
*H04L 12/859* (2013.01)
*H04L 12/741* (2013.01)
(Continued)

(52) U.S. Cl.
CPC ........ *H04L 47/2475* (2013.01); *H04L 45/745* (2013.01); *H04L 67/10* (2013.01); *H04L 69/16* (2013.01)

(58) Field of Classification Search
CPC ............. H04L 47/2475; H04L 47/2483; H04L 47/2491; H04L 47/18; H04L 47/14;
(Continued)

(56) References Cited

U.S. PATENT DOCUMENTS

2007/0244987 A1\* 10/2007 Pedersen ................. H04L 67/34
709/217
2011/0142062 A1\*  6/2011 Wang ...................... H04L 12/66
370/401

(Continued)

FOREIGN PATENT DOCUMENTS

| CN | 101902484 A | 12/2010 |
|----|-------------|---------|
| CN | 103036803 A | 4/2013  |
| CN | 103582512 A | 2/2014  |

OTHER PUBLICATIONS

The European Patent Office (EPO) The Extended European Search Report for 16918622.8 (PCT/CN2016/106054) dated Apr. 8, 2019 10 Pages.

(Continued)

*Primary Examiner* — Un C Cho
*Assistant Examiner* — Rasha K Fayed
(74) *Attorney, Agent, or Firm* — Anova Law Group, PLLC

(57) ABSTRACT

A method for managing traffic of application programs includes: reading attribute information of a data packet sent by an application program, where the attribute information indicates a source of the data packet; based on the attribute information of the data packet, determining whether the application program that sends the data packet is a designated broadcasting tool, thereby differentially managing a (Continued)

data packet from the designated broadcasting tool and a data packet not from the designated broadcasting tool.

10 Claims, 5 Drawing Sheets

(51) Int. Cl.
*H04L 29/08* (2006.01)
*H04L 29/06* (2006.01)

(58) Field of Classification Search
CPC ....... H04L 67/10; H04L 67/125; H04L 67/14;
H04L 67/2823; H04L 67/104; H04L
67/00; H04L 45/745; H04L 45/306; H04L
45/64; H04L 45/22; H04L 45/54; H04L
45/00; H04L 69/16; H04L 69/00; H04L
69/162; H04L 69/22; H04L 69/30; H04L
69/18; H04L 69/329; H04L 69/14; H04L
69/161; H04L 12/859; H04L 12/741;
H04L 12/56; H04L 12/28; H04L 12/5692;
H04L 12/2854; H04L 29/06; H04L 29/08;
H04L 63/1408; H04L 63/101; H04L
63/145; H04L 63/1483; H04L 63/0428;
H04L 41/0893; H04L 65/1016; H04L
65/1006; H04L 65/1043; H04L 65/105;
H04L 65/4076; H04L 65/4084; H04L
65/607; H04L 9/0844; H04L 9/12; H04W
80/04; H04W 80/00; H04W 40/02; H04W
40/34; H04W 40/28; H04W 40/00; H04W
40/248
See application file for complete search history.

(56) References Cited

U.S. PATENT DOCUMENTS

| | | | |
|---|---|---|---|
| 2011/0151944 A1* | 6/2011 | Morgan | H04W 52/0258 455/574 |
| 2012/0143976 A1* | 6/2012 | Lindquist | H04N 21/4882 709/206 |
| 2012/0324568 A1* | 12/2012 | Wyatt | G06F 21/51 726/13 |
| 2013/0052992 A1* | 2/2013 | Lee | G06F 21/52 455/411 |
| 2013/0227636 A1* | 8/2013 | Bettini | H04W 12/12 726/1 |
| 2015/0215219 A1 | 7/2015 | Mattsson et al. | |

OTHER PUBLICATIONS

The World Intellectual Property Organization (WIPO) International Search Report for PCT/CN2016/106054 dated Jul. 10, 2017 6 Pages.

* cited by examiner

METHOD AND SYSTEM FOR MANAGING TRAFFIC OF APPLICATION PROGRAMS, AND TERMINAL DEVICE CONTAINING THE SYSTEM

CROSS-REFERENCES TO RELATED APPLICATIONS

This application is a national phase entry under 35 U.S.C § 371 of International Application No. PCT/CN2016/106054, filed on Nov. 16, 2016, which claims priority of Chinese Patent Application No. 201610882916.3, filed with the State Intellectual Attribute Office of P. R. China on Oct. 10, 2016, the entire contents of all of which are incorporated herein by reference.

FIELD OF THE DISCLOSURE

The present disclosure belongs to the technical field of terminal device and relates to a management method and system and, more particularly, relates to a method and a system for managing traffic of application programs, and a terminal device having the system.

BACKGROUND

The same as personal computers, smart mobile terminals each has an independent operating system, and users can, by themselves, install programs such as software and games, provided by third-party service providers. Through this type of programs, features of the terminal are extended, and portable devices that access wireless network is realized through a mobile communication network. Common smart mobile terminals include smart phones and tablets. Due to their high portability, the smart mobile terminals are becoming the terminal devices that people use with the highest frequency.

Existing smart mobile terminal devices are often installed with various applications, and traffic of different applications need to be differentially managed, to enhance the experience of accessing the smart mobile terminals.

However, conventional traffic management often includes two steps:

First is to convert information of a data packet to an owner attribute;

Second is to manage the traffic of different owners, where current traffic management is often observed at routers and remote servers, and ip is often used as the minimal management granularity.

The conventional technologies of traffic management cannot differentially manage traffic of different APPs.

Therefore, it has been as issue for those skilled in the relevant art to provide a method and a system for managing traffic of application programs as well as a terminal device having the system, to overcome the deficiency in the conventional technologies that traffic of different APPs cannot be differentially managed.

BRIEF SUMMARY OF THE DISCLOSURE

In view of the aforementioned deficiencies of the conventional technologies, the objective of the present disclosure is to provide a method and a system for managing traffic of application programs, and to provide a terminal device that includes the system, which are to solve the issues that the conventional technologies cannot be used to differentially manage the traffic of different APPs.

To realize the above objective and other related objectives, one aspect of the present disclosure provides a method for managing traffic of application programs, and the method for managing the traffic of the application programs includes: reading attribute information of a data packet sent by an application program, where the attribute information indicates a source of the data packet; based on the attribute information of the data packet, determining whether the application program that sends the data packet is a designated broadcasting tool, thereby differentially managing a data packet from the designated broadcasting tool and a data packet not from the designated broadcasting tool.

In one embodiment of the present disclosure, a step of determining whether the application program that sends the data packet is a designated broadcasting tool, thereby differentially managing a data packet from the designated broadcasting tool and a data packet not from the designated broadcasting tool includes: converting the attribute information of the data packet to an identifier corresponding to the application program that sends the data packet; determining whether the identifier corresponding to the application program is an identifier of the designated broadcasting tool; if the identifier corresponding to the application program is an identifier of the designated broadcasting tool, it is determined that the application program is the designated broadcasting tool, a foreground process is queried, and a package name of the data packet is mapped to a package name of the foreground process; and if the identifier corresponding to the application program is not the identifier of the designated broadcasting tool, converting the identifier of the application program to a package name of the application program.

In one embodiment of the present disclosure, the attribute information of the data packet that indicates the source of the data packet includes source port information of the data packet; and a step of converting the attribute information of the data packet to an identifier corresponding to the application program that sends the data packet includes, based on the source port information of the data packet, searching for an identifier that matches the source port information of the data packet sent by the application program from a first query table that records TCP connection states.

In one embodiment of the present disclosure, a step of, if the identifier corresponding to the application program is not the identifier of the designated broadcasting tool, converting the identifier of the application program to a package name of the application program, includes: based on the identifier corresponding to the application program, searching for a package name of the application program that matches the identifier from a second query table that records package names of application programs that send data packets; or based on a searching interface for searching package names of application programs that send data packets, searching for the package name of the application program; and converting the identifier of the application program to the package name of the application program.

In one embodiment of the present disclosure, the designated broadcasting tool is the MediaServer component of the Android system.

Another aspect of the present disclosure provides a system for managing traffic of application programs, and the system for managing traffic of the application programs includes: a reading module, configured to read attribute information of a data packet sent by an application program, where the attribute information indicates a source of the data packet; a management module, configured to, based on the attribute information of the data packet, determine whether the application program that sends the data packet is a designated broadcasting tool, thereby differentially managing a data packet from the designated broadcasting tool and a data packet not from the designated broadcasting tool.

In one embodiment of the present disclosure, the management module includes: a converting unit, configured to convert the attribute information of the data packet to an identifier corresponding to the application program that sends the data packet; a processing unit, configured to determine whether the identifier corresponding to the application program is an identifier of the designated broadcasting tool; if the identifier corresponding to the application program is an identifier of the designated broadcasting tool, it is determined that the application program is the designated broadcasting tool, a foreground process is queried, and a package name of the data packet is mapped to a package name of the foreground process.

In one embodiment of the present disclosure, the attribute information of the data packet that indicates the source of the data packet includes source port information of the data packet. The converting unit is configured to, based on the source port information of the data packet, search for an identifier that matches the source port information of the data packet sent by the application program from a first query table that records TCP connection states.

In one embodiment of the present disclosure, if the identifier corresponding to the application program is not determined to be the identifier of the designated broadcasting tool, based on the identifier corresponding to the application program, the processing unit searches for a package name of an application program that matches the identifier from a second query table that records package names of application programs that send data packets; or based on a searching interface for searching package names of application programs that send data packets, the processing unit searches for a package name of the application program; and the processing unit converts the identifier of the application program to the package name of the application program.

Another aspect of the present disclosure provides a terminal device, and the terminal device includes: a system for managing traffic of application programs.

As described above, the method and the system for managing traffic of application programs and the terminal device that includes the disclosed system may realize precise management on the traffic of different application programs, without intervention from APPs and without modification on the system architecture of the terminal device.

Figure 1:
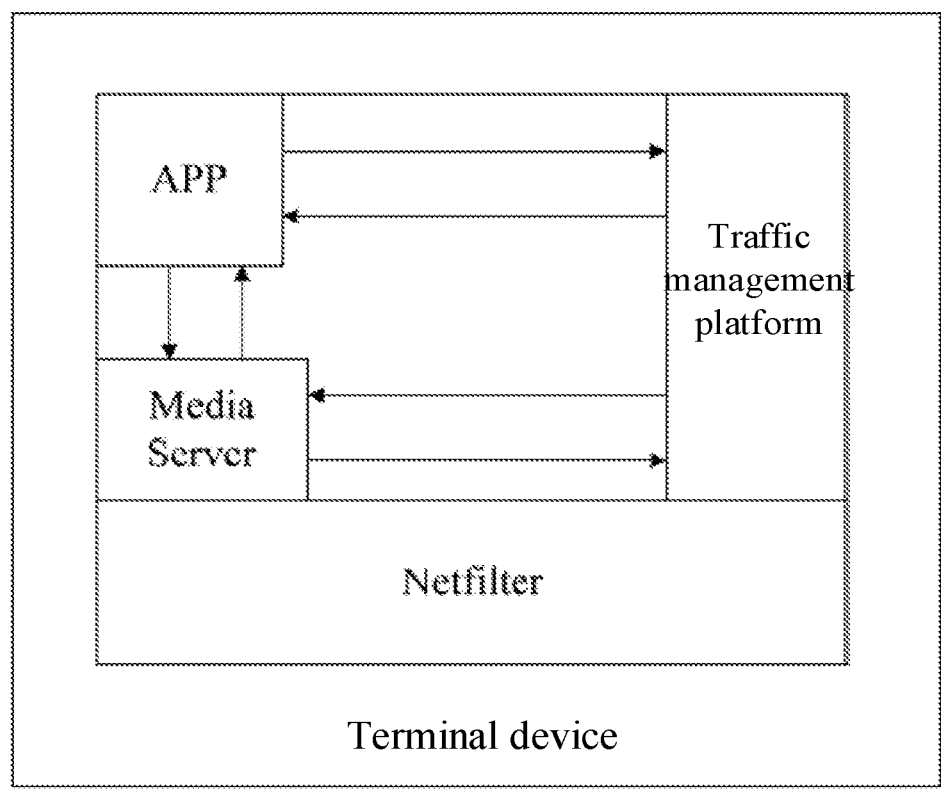
FIG. 1 illustrates a structural schematic view of system configuration of a terminal device according to embodiments of the present disclosure.

REFERENCE NUMERALS OF COMPONENTS 1 terminal device
2 system for managing traffic of application programs
21 initialization module
22 receiving module
23 redirecting module
24 reading module
25 management module
251 converting unit
252 processing unit
253 traffic management unit
S1~S6 steps
S51~S54 steps

DETAILED DESCRIPTION

Embodiments of the present disclosure are illustrated with reference to specific embodiments, and those skilled in the relevant art shall understand other advantages and effects of the present disclosure from descriptions of the present specification without effort. The present disclosure may be embodied or applied using other different embodiments, and details of the present specification may be modified or altered based on different views of points and application scenarios without departing from the spirit of the present disclosure. It shall be noted that, without conflict, embodiments and features of the embodiments may be exchanged.

It shall be noted that, the drawings provided by embodiments hereinafter merely illustrate the basic concept of the present disclosure, and only related components are displayed in the drawings. The drawings may not be provided with actual number, shape, and dimension of the components in implementation, and the shape, number and scale of each component may be varied freely in implementation. The layout and configuration of the components may be more complicated.

The technical principles of the method and system for managing traffic of application programs are as follows:

The status and traffic of an application program (App) calling mediaPlayer to play a video may be correlated, and implemented at the application layer in the OSI (Open Systems Interconnection reference) model or TCP/IP protocol model, and recognition on the traffic of the App relies on the UID (User Identification) attribute of the App. That is, there is a correspondence relationship between the data packet information and the UID, and UID is the only identifier of the App in the operating system. Thus, through the data packet information, which App sends out a data packet may be determined, such that management on traffic of different Apps, i.e., traffic of the designated players and other traffic, may be realized.

Embodiment 1

The present disclosure provides a method for managing traffic of application programs. The method for managing traffic of the application program includes following steps:
Intercepting a data packet sent by an application program;
reading attribute information of the data packet that indicates a source of the data packet;
based on the attribute information of the data packet, determining whether the application program that sends the data packet is a designated broadcasting tool, thereby differentially managing a data packet from the designated broadcasting tool and a data packet not from the designated broadcasting tool.

With reference to the accompanying drawings, the method for managing the traffic of the application program is described in detail. The disclosed method for managing the traffic of the application program may be applied to a terminal device. Practical implementations of the terminal device may include a smart cellphone, a tablet, a set-up box, and an IPAD, etc. Referring to FIG. 1, a three-dimensional schematic view of a terminal device according to embodiments of the present disclosure is illustrated.

In one embodiment, given the terminal device being a smart cellphone as an example for illustration. The smart cellphone may be, for example, installed with an Android operating system or an iOS operating system, or a Palm OS, a Symbian, a Black Berry OS 6.0, or a Windows Phone 8. In one embodiment, a touch screen may be configured to output and display a user interface of application program icons. The user interface of application program icons may include a plurality of application programs icons.

In one embodiment, the method for managing the traffic of the application program may be realized by configuring, in the terminal device, APP, MediaServer and a traffic management platform at the application layer and configuring Netfilter at the IP layer. Referring to FIG. 1, a structural schematic view showing system configuration of a terminal device is illustrated.

Figure 2:
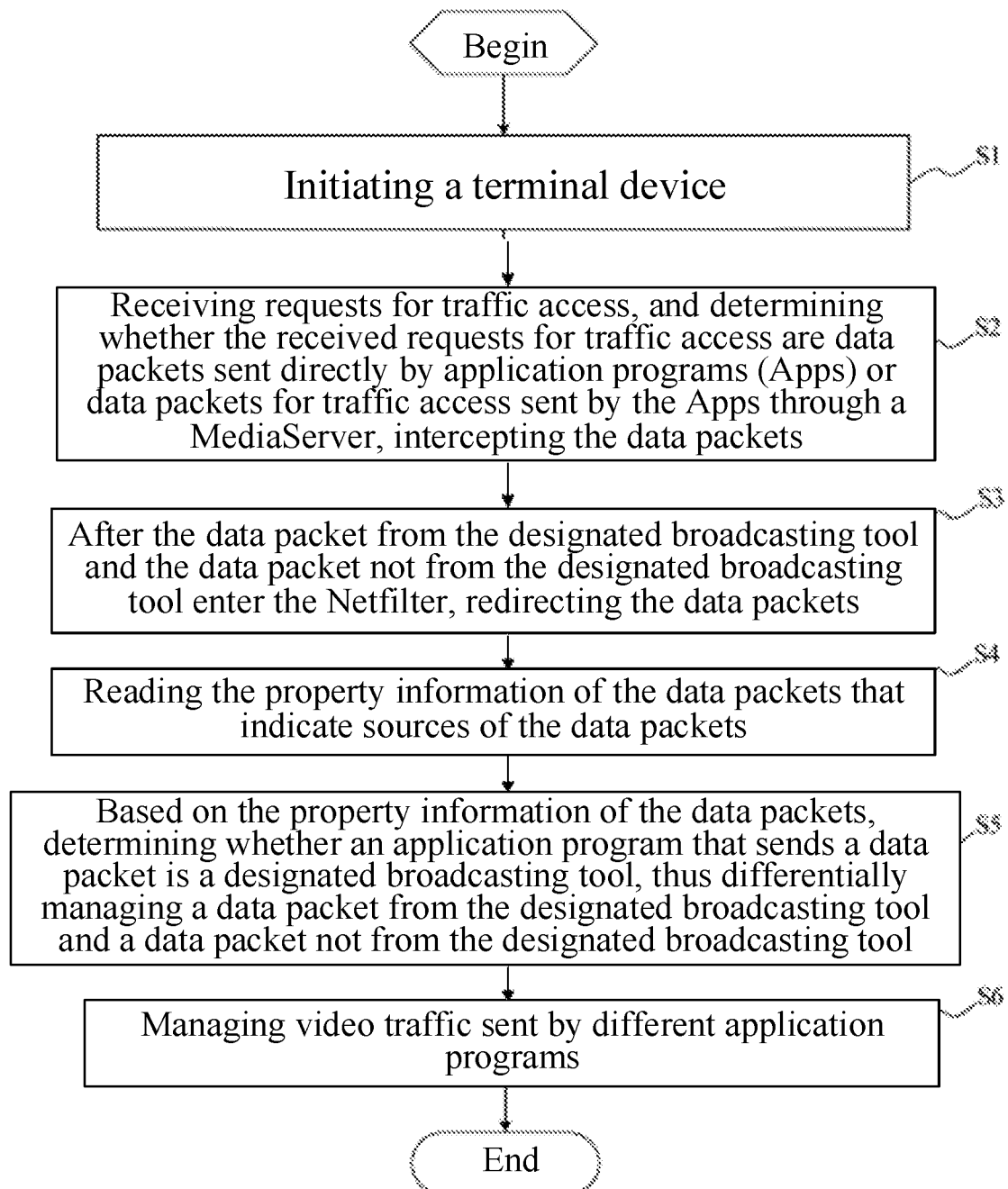
FIG. 2 illustrates an exemplary flow diagram of a method for managing traffic of application programs according to embodiments of the present disclosure.

Referring to FIG. 2, an exemplary flow diagram of a method for managing traffic of application programs according to embodiments of the present disclosure is provided. In some embodiments, only management of the traffic is provided, and the traffic includes mediaPlayer traffic and non-mediaPlayer traffic. As shown in FIG. 2, the method for managing the traffic of the application programs specifically includes the following steps:

S1, initiating the terminal device;

S2, receiving requests for traffic access, and determining whether the received requests for traffic access are data packets sent directly by application programs (Apps) or data packets for traffic access sent by the Apps through a MediaServer. For example, when the App calls the MediaPlayer to play a video, because the architecture of MediaPlayer is a structure of C/S (client/server), the App actually sends a video broadcasting request to the MediaServer through a client of the MediaPlayer, and under this situation, the video broadcasting request is sent by the MediaServer. In one embodiment, the data packets for requesting to play the video include a data packet from the designated broadcasting tool and a data packet not from the designated broadcasting tool. The data packet from the designated broadcasting tool and the data packet not from the designated broadcasting tool may be sent to Netfilter. In one embodiment, the designated broadcasting tool is the MediaServer component of the Android system. In one embodiment, step S2 further includes: during a process where the data packet from the designated broadcasting tool and the data packet not from the designated broadcasting tool are sent to a proxy server or a source station, intercepting, by a traffic management platform, the data packets sent by application programs. That is, the data packet from the designated broadcasting tool and the data packet not from the designated broadcasting tool may be intercepted. In one embodiment, before intercepting the data packets sent by the application programs, the terminal device remains in a waiting state to intercept the data packets.

S3, after entering the Netfilter, the data packet from the designated broadcasting tool and the data packet not from the designated broadcasting tool are redirected by a network firewall.

In particular, the iptables rule is: iptables [-t table] command [chain] [match][-j target]

Note: iptables [-t table name]-command [chain][match][-j action/target].

S4, the traffic management platform reads the attribute information of the data packet from the designated broadcasting tool and of the data packet not from the designated broadcasting tool that indicate sources of the data packets. In one embodiment, the attribute information of a data packet that indicates a source of the data packet includes a source port information of the data packet. That is, the source port information of the data packet from the designated broadcasting tool and the source port information of the data packet not from the designated broadcasting tool may be read.

Figure 3:
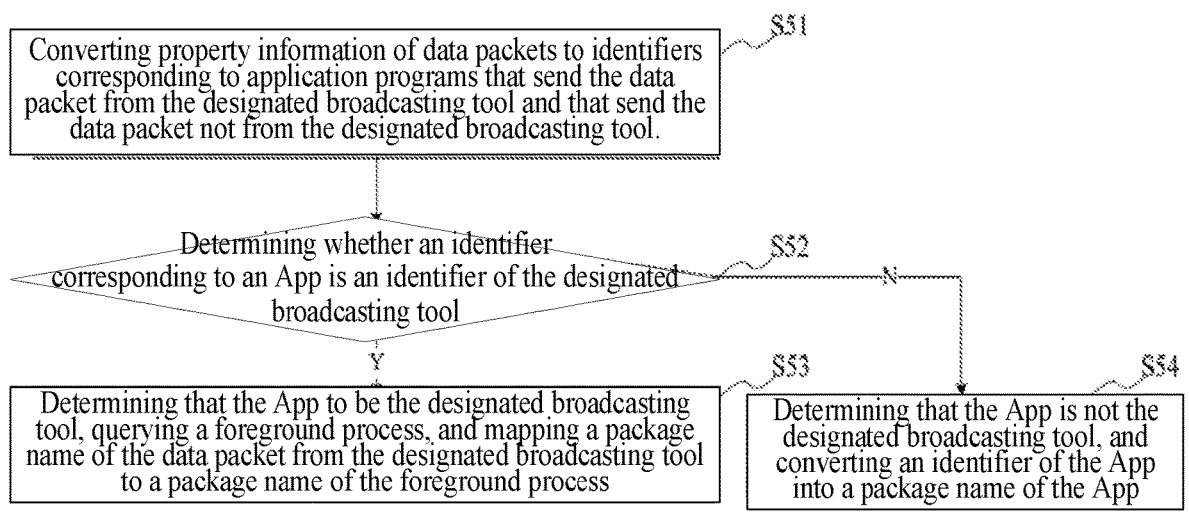
FIG. 3 illustrates an exemplary flow diagram of step S5 in a method for managing traffic of application programs according to embodiments of the present disclosure.

S5, based on the attribute information of the data packets, the traffic management platform determines whether an application program that sends a data packet is the designated broadcasting tool, and performs differential traffic management on the data packet from the designated broadcasting tool and the data packet not from the designated broadcasting tool. In one embodiment, the designated broadcasting tool is the MediaPlayer. This is because many exiting application programs play videos by calling the MediaPlayer. Referring to FIG. 3, a schematic view illustrating step S5 is displayed. The step S5 may specifically include following steps:

S51, converting the attribute information of the data packets, i.e., the source port information of the data packet from the designated broadcasting tool and the source port information of the data packet not from the designated broadcasting tool, to identifiers corresponding to application programs that send the data packet from the designated broadcasting tool and that send the data packet not from the designated broadcasting tool. Specifically, based on the source port information of the data packets, identifiers that match the source port information of the data packets sent by the application programs are looked up in a first query table that records TCP connection states. In one embodiment, the first query table is /proc/net/tcp(udp); and the identifier is UID.

S52, determining whether the identifier corresponding to an application program is an identifier of the designated broadcasting tool. If the identifier corresponding to the application program (App) is the identifier of the designated broadcasting tool, the application program is indicated to be a designated broadcasting tool (e.g., MediaPlayer), and step S53 is executed; and if the identifier corresponding to the application program is not the identifier of the designated broadcasting tool, it is indicated that the application program is an undesignated broadcasting tool (e.g., the MediaPlayer), and step S54 is executed. In one embodiment, the identifier of the foreground process is 1013. In the terminal device, when installing the App and the media server, the operating system may uniformly assign an UID to the APP, and the UID of the designated broadcasting tool (App) that sends the data packet is fixed to be 1013.

S53, determining that the App to be the designated broadcasting tool (MediaPlayer), querying a foreground process, and mapping a package name of the data packet from the designated broadcasting tool to a package name of the foreground process. In one embodiment, when the App calls the MediaPlayer to perform traffic access, the data packet from the designated broadcasting tool with UID of 1013 is triggered by the foreground process. Thus, the package name of the triggered data packet from the designated broadcasting tool is mapped to the package name of the foreground process.

S54, determining that the App is an undesignated broadcasting tool, and converting an identifier of the App into a package name of the App. Specifically, based on the identifier of the App, which is the undesignated broadcasting tool (MediaPlayer), that performs traffic access, the package name of the App is acquired and recorded. In one embodiment, based on the identifier corresponding to the application program, the package name of the App that matches the identifier is looked up in a second query table, e.g., the table: /data/system/package.xml that records package names of Apps sending data packets. Or, based on the searching interface that searches for the package names of Apps sending the data packet, i.e., the software development kit (SDK) interface getPackagesForUid, the package name of the App is looked up, and the obtained package name is recorded. Further, the identifier of the App is converted to the package name of the App.

S6, based on the package name, managing the traffic sent by the App of the foreground process and the App of non-foreground process. In one embodiment, managing the traffic sent by different Apps includes directing on the traffic and counting the traffic, etc.

The disclosed method for managing the traffic of application programs realizes precise management on the traffic from different Apps, without intervention from Apps and without modification on the system architecture of the terminal device.

Embodiment 2

Figure 4:
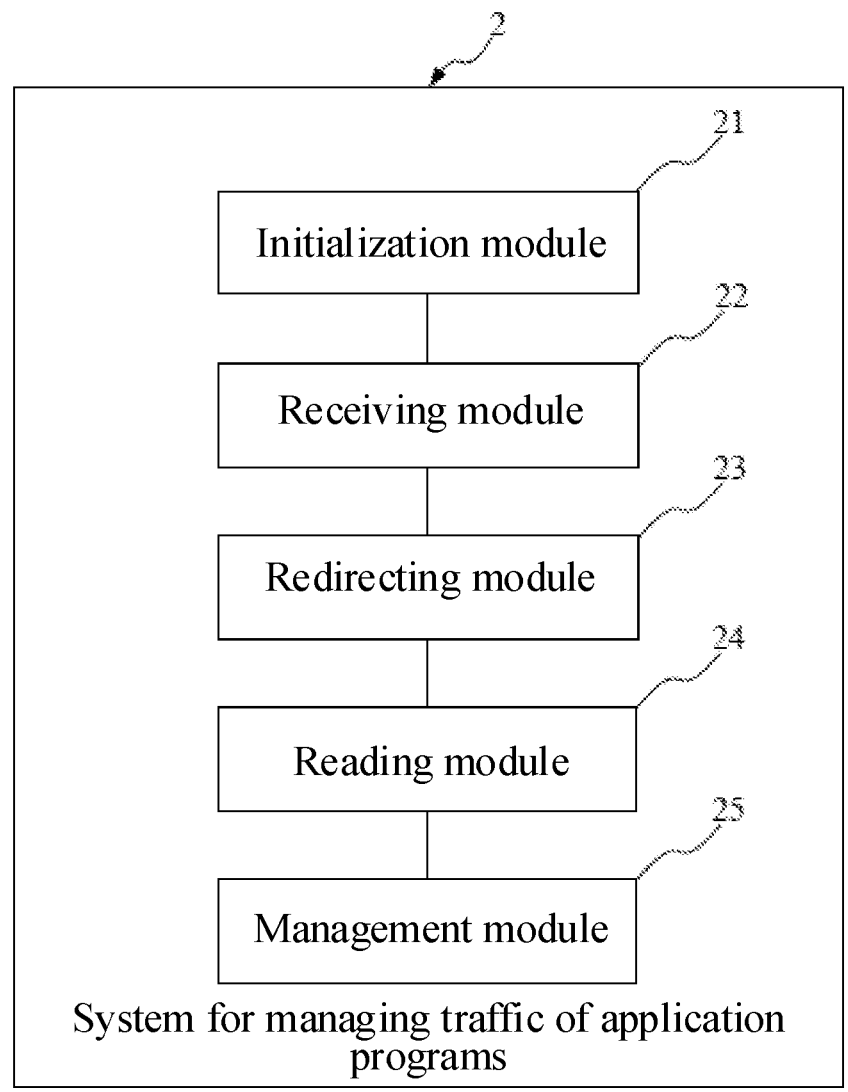
FIG. 4 is an exemplary structural schematic view that illustrates principles of a system for managing traffic of application programs according to embodiments of the present disclosure.

The present disclosure provides a system 2 for managing traffic of application programs, and the system 2 may be applied to a terminal device 1. Referring to FIG. 4, an exemplary structural schematic view that illustrates principles of a system for managing traffic of application programs according to embodiments of the present disclosure is provided. As shown in FIG. 4, the system 2 for managing traffic of the application programs includes: an initialization module 21, a receiving module 22, a redirecting module 23, a reading module 24, and a management module 25.

The initialization module 21 is configured to initiate the terminal device.

The receiving module 22 coupled to the initialization module 21 is configured to receive requests for traffic access, and determine whether the received requests for traffic access are data packets sent directly by application programs (Apps) or data packets for traffic access sent by the Apps through a MediaServer. In one embodiment, when the App calls the MediaPlayer to play a video, because the architecture of MediaPlayer is a structure of C/S (client/server), the App actually sends a video broadcasting request to the MediaPlayer through a client of the MediaServer, and under this situation, the video broadcasting request is sent by the MediaServer. In one embodiment, the data packets configured to request playing of the video includes a data packet from the designated broadcasting tool and a data packet not from the designated broadcasting tool. The data packet from the designated broadcasting tool and the data packet not from the designated broadcasting tool may be sent to Netfilter. In one embodiment, the receiving module 22 is further configured to, when the application program is sending the data packets to a remote server or a source station, use a traffic management platform to intercept the data packet from the designated broadcasting tool and the data packet not from the designated broadcasting tool. In one embodiment, before intercepting the data packets sent by the application program, the terminal device remains in a waiting state to intercept the data packets.

The redirecting module 23 coupled to the receiving module 22 may be configured to utilize a network firewall to redirect the data packet from the designated broadcasting tool and the data packet not from the designated broadcasting tool, after the data packet from the designated broadcasting tool and the data packet not from the designated broadcasting tool enter the Netfilter. For example, the iptables is utilized to redirect the data packet from the designated broadcasting tool.

The reading module 24 coupled to the receiving module 22 and the redirecting module 23 may be configured to read the attribute information of the data packet from the designated broadcasting tool and of the data packet not from the designated broadcasting tool, which indicates sources of the data packets. In one embodiment, the attribute information of a data packet that indicates a source of the data packet includes source port information of the data packet. That is, the source port information of the data packet from the designated broadcasting tool and the source port information of the data packet not from the designated broadcasting tool may be read.

Figure 5:
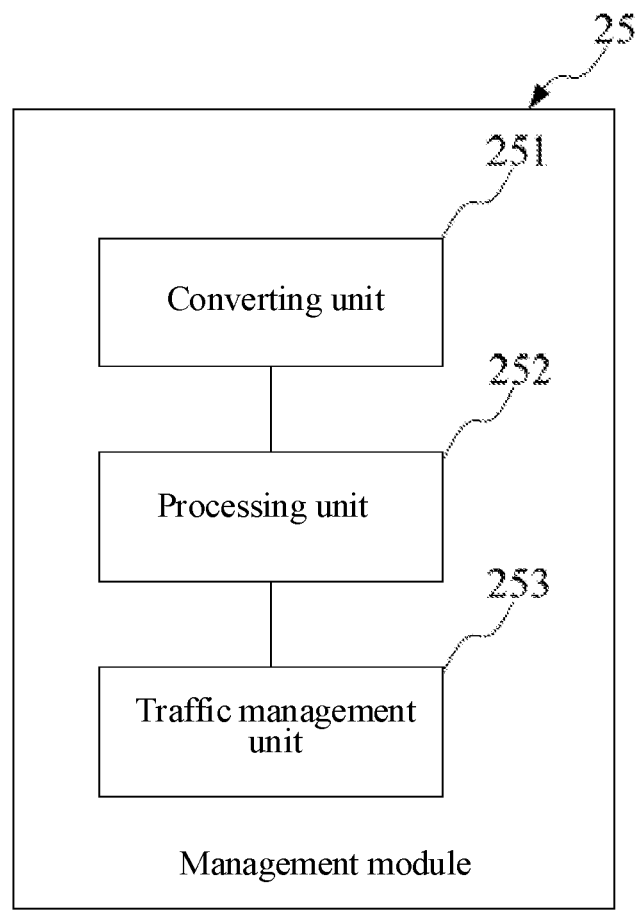
FIG. 5 is an exemplary structural schematic view that illustrates principles of a management module in a system for managing traffic of application programs according to embodiments of the present disclosure.
Figure 6:
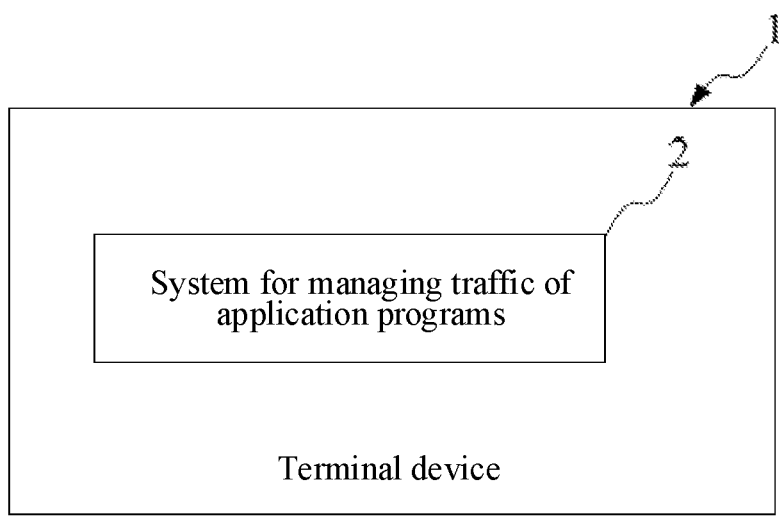
FIG. 6 is a structural schematic view that illustrates principles of a terminal device according to embodiments of the present disclosure.

The management module 25 coupled to the reading module 24 is configured to, based on the attribute information of the data packet, determine whether an application program that sends a data packet is the application program that calls the designated broadcasting tool to play the video, to manage the traffic of different Apps. Referring to FIG. 5, an exemplary structural schematic view that illustrates principles of a management module is provided. As shown in FIG. 5, the management module 25 further includes: a converting unit 251, a processing unit 252, and a traffic management unit 253.

The converting unit 251 is configured to, convert the attribute information of the data packets, i.e., the source port information of the data packet from the designated broadcasting tool and the source port information of the data packet not from the designated broadcasting tool, to identifiers corresponding to application programs that send the data packet from the designated broadcasting tool and that send the data packet not from the designated broadcasting tool. Specifically, based on the source port information of the data packets, identifiers that match the source port information of the data packets sent by the application programs are looked up in a first query table that records TCP connection states. In one embodiment, the first query table is /proc/net/tcp(udp); and the identifier is UID.

The processing unit 252 coupled to the converting unit 251 may be configured to determine whether an identifier corresponding to an application program are an identifier of the designated broadcasting tool. If the identifier corresponding to an application program is the identifier of the designated broadcasting tool, the application program is indicated to be the designated broadcasting tool (e.g., MediaPlayer), and the processing unit 252 quires the foreground process and maps the package name of the data packet from the designated broadcasting tool to the package name of the foreground process. If the identifier corresponding to the application program is not the identifier of the designated broadcasting tool, it is indicated that the application program is an undesignated broadcasting tool (e.g., the MediaPlayer), and the processing unit 252 converts the identifier of the App to the package name of the App. In one embodiment, based on the identifier corresponding to the App, the package name of the App that matches the identifier is looked up in the second query table that records package names of Apps sending data packets, i.e., the table/data/system/package.xml. Or, based on the searching interface that searches for the package names of the Apps that send the data packets, i.e., the SDK interface getPackagesForUid, the package name of the App is looked up, and the obtained package name is recorded. Further, the identifier of the APP is converted to the package name of the App. In one embodiment, the identifier of the foreground process is 1013. In the terminal device, when installing the App and the media server, the system may uniformly assign an UID to the App, and the UID of the App that sends the data packet through the designated broadcasting tool is fixed to be 1013. In one embodiment, when the processing unit 252 determines that the application program is an undesignated broadcasting tool, the processing unit 252 may convert the identifier of the App to the package name of the App. For example, according to an identifier of an App that an undesignated broadcasting tool (MediaPlayer) has a traffic access thereto, the processing unit obtains and records a package name of the App. In one embodiment, based on the identifier corresponding to the App, from the second query table that records package names of the App sending data packets, i.e., the table/data/system/package.xml, the package name of the App that matches the identifier is search for. Or, based on the searching interface that searches for the package names of the App that sends the data packet, i.e., the SDK interface getPackagesForUid, the package name of the App is looked up, and the obtained package name is recorded. Further, the identifier of the App is converted to the package name of the App.

The traffic management unit 253 coupled to the processing unit 252 may be configured to manage the audio/video traffic sent by the App of the foreground process and the App of non-foreground process based on the package name. In one embodiment, managing the traffic sent by different Apps includes directing the traffic and counting the traffic, etc.

The present disclosure further provides a terminal device 1. Referring to FIG. 7, a structural schematic view that illustrates principles of a terminal device according to embodiments of the present disclosure is provided. As shown in FIG. 7, the terminal device 1 may include the aforementioned system 2 for managing traffic of the application programs. The terminal device may be any one of a set-up box, a tablet, or a cellphone.

As such, the disclosed method and system for managing traffic of application programs and the disclosed terminal device having the system may realize precise management on the traffic of different application programs, without intervention from Apps and without modification on the system architecture of the terminal device. Thus, the present disclosure displays high commercial utilization value by overcoming various deficiencies of the prior art.

The foregoing embodiments are merely to illustrate the principles and functions of the present disclosure, and are not intended to be limiting of the present disclosure. Without departing from the spirit and scope of the present disclosure, anyone skilled in the relevant art can modify or change the aforementioned embodiments. Therefore, without departing from the spirit and scope of the present disclosure, any equivalent modifications or changes made possible by those ordinarily skilled in the relevant art shall all fall within the scope defined by the appended claims of the present disclosure.

What is claimed is:

1. A method for managing traffic of application programs, comprising:
   reading attribute information of a data packet sent by an application program, wherein the attribute information indicates a source of the data packet; and
   based on the attribute information of the data packet, determining whether the application program that sends the data packet is a designated broadcasting tool, thereby differentially managing a data packet from the designated broadcasting tool and a data packet not from the designated broadcasting tool,
   wherein the determining whether the application program that sends the data packet is a designated broadcasting tool, thereby differentially managing a data packet from the designated broadcasting tool and a data packet not from the designated broadcasting tool comprises:
   converting the attribute information of the data packet to an identifier corresponding to the application program that sends the data packet;
   determining whether the identifier corresponding to the application program is an identifier of the designated broadcasting tool;
   in response to the identifier corresponding to the application program being an identifier of the designated broadcasting tool, determining the application program to be the designated broadcasting tool, querying a foreground process, and mapping a package name of the data packet to a package name of the foreground process; and
   in response to the identifier corresponding to the application program not being the identifier of the designated broadcasting tool, converting the identifier of the application program to a package name of the application program.

2. The method according to claim 1, wherein:
   the attribute information of the data packet that indicates the source of the data packet includes source port information of the data packet; and
   the converting the attribute information of the data packet to an identifier corresponding to the application program that sends the data packet includes:
      based on the source port information of the data packet, looking up an identifier that matches the source port information of the data packet sent by the application program in a first query table that records TCP connection states.

3. The method according to claim 1, the in response to the identifier corresponding to the application program not being the identifier of the designated broadcasting tool, converting the identifier of the application program to a package name of the application program, comprises:
   based on the identifier corresponding to the application program, looking up a package name of an application program that matches the identifier in a second query table that records package names of application programs that send data packets; or
   based on a searching interface for searching package names of application programs that send data packets, searching for the package name of the application program; and
   converting the identifier of the application program to the package name of the application program.

4. The method according to claim 1, wherein:
   the designated broadcasting tool is MediaServer component of an Android system.

5. A system for managing traffic of application programs, comprising a plurality of functional modules implemented by computer programs stored in a memory and executable by a processor, the plurality of functional modules comprising:

a reading module, configured to read attribute information of a data packet sent by an application program, wherein the attribute information indicates a source of the data packet;

a management module, configured to, based on the attribute information of the data packet, determine whether the application program that sends the data packet is a designated broadcasting tool, thereby differentially managing a data packet from the designated broadcasting tool and a data packet not from the designated broadcasting tool, wherein the management module is specifically configured to:

convert the attribute information of the data packet to an identifier corresponding to the application program that sends the data packet;

determine whether the identifier corresponding to the application program is an identifier of the designated broadcasting tool; and in response to the identifier corresponding to the application program being an identifier of the designated broadcasting tool, determine that the application program is the designated broadcasting tool, query a foreground process, and map a package name of the data packet to a package name of the foreground process.

6. The system according to claim 5, wherein:

the attribute information of the data packet that indicates the source of the data packet includes source port information of the data packet; and the management module is configured to, based on the source port information of the data packet, look up an identifier that matches the source port information of the data packet sent by the application program in a first query table that records TCP connection states.

7. The system according to claim 5, wherein the management module is further configured to:

in response to the identifier corresponding to the application program being the identifier of the designated broadcasting tool, based on the identifier corresponding to the application program, look up a package name of the application program that matches the identifier from a second query table that records package names of application programs that send data packets; or in response to the identifier corresponding to the application program not being the identifier of the designated broadcasting tool, based on a searching interface for searching package names of application programs that send data packets, search for the package name of the application program; and convert the identifier of the application program to the package name of the application program.

8. A terminal device, comprising:

a system for managing traffic of application programs, wherein the system includes a plurality of functional modules implemented by computer programs stored in a memory and executable by a processor, the plurality of functional modules comprising:

a reading module, configured to read attribute information of a data packet sent by an application program, wherein the attribute information indicates a source of the data packet;

a management module, configured to, based on the attribute information of the data packet, determine whether the application program that sends the data packet is a designated broadcasting tool, thereby differentially managing a data packet from the designated broadcasting tool and a data packet not from the designated broadcasting tool, wherein the management module is specifically configured to:

convert the attribute information of the data packet to an identifier corresponding to the application program that sends the data packet;

determine whether the identifier corresponding to the application program is an identifier of the designated broadcasting tool; and in response to the identifier corresponding to the application program being an identifier of the designated broadcasting tool, determine that the application program is the designated broadcasting tool, query a foreground process, and map a package name of the data packet to a package name of the foreground process.

9. The terminal device according to claim 8, wherein:

the attribute information of the data packet that indicates the source of the data packet includes source port information of the data packet; and the management module is configured to, based on the source port information of the data packet, look up an identifier that matches the source port information of the data packet sent by the application program in a first query table that records TCP connection states.

10. The terminal device according to claim 8, wherein the management module is further configured to:

in response to the identifier corresponding to the application program not being the identifier of the designated broadcasting tool, based on the identifier corresponding to the application program, look up a package name of the application program that matches the identifier from a second query table that records package names of application programs that send data packets; or in response to the identifier corresponding to the application program not being the identifier of the designated broadcasting tool, based on a searching interface for searching package names of application programs that send data packets, search for the package name of the application program; and convert the identifier of the application program to the package name of the application program.

* * * * *